United States Patent
Ivanov et al.

(10) Patent No.: US 6,295,017 B1
(45) Date of Patent: *Sep. 25, 2001

(54) JAMMER DETECTION AND TRACKING SYSTEM

(75) Inventors: Alex Ivanov, Acton, MA (US); Joseph E. Marquis, Londonderry; Robert M. Girard, Hudson, both of NH (US); Wesley T. Dull, Chelmsford, MA (US)

(73) Assignee: Raytheon Company, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 07/211,728

(22) Filed: Jun. 27, 1988

(51) Int. Cl.[7] ............................. G01S 7/36; G01S 13/00
(52) U.S. Cl. ................................... 342/17; 342/98
(58) Field of Search .................... 342/16, 17, 62, 342/98, 99

(56) References Cited

U.S. PATENT DOCUMENTS

| | | |
|---|---|---|
| 3,569,965 | * 3/1971 | Bagley . |
| 3,938,148 | * 2/1976 | Hobson . |
| 4,011,564 | * 3/1977 | Gulick, Jr. . |
| 4,190,837 | * 2/1980 | Salvavdon et al. . |
| 4,241,889 | * 12/1980 | Schwellinger et al. . |
| 4,256,275 | * 3/1981 | Flick et al. . |
| 4,688,042 | * 8/1987 | Cronson et al. . |

OTHER PUBLICATIONS

"Radar Handbook," pp 16–19 and 16–20, M. I. Skolnik, Editor–in–Chief, McGraw–Hill Book Co., 1970.

* cited by examiner

Primary Examiner—Mark Hellner
(74) Attorney, Agent, or Firm—Daly, Crowley & Mofford, LLP

(57) ABSTRACT

A radar receiver adapted to detect and track a narrow band jammer is shown to include logic circuitry adapted successively to sense jamming signals from such a jammer to determine the extant frequency of the speed gate when the amplitude of the automatic gain control signal increases and to determine whether or not the received signals are coherent, and, finally, if the received signals are not coherent, to produce a tracking control signal effective to cause tracking of the narrow band jammer.

3 Claims, 2 Drawing Sheets

JAMMER DETECTION AND TRACKING SYSTEM

BACKGROUND OF THE INVENTION

This invention pertains generally to semiactive missile guidance systems, and in particular to an improved system for detecting and tracking an airborne narrow band noise jammer, thereby enabling the deleterious effects of such jammer to be countered.

As is known, narrow band jamming is a self-screening electronic countermeasure (ECM) technique (for use particularly against continuous wave (CW) or Doppler radars) in which a narrow band noise jammer produces a jamming signal centered about the carrier frequency of a victim radar. The narrow band noise will not be detected by the jammer analysis circuits of the victim radar because such circuits test for the presence of jamming signals from noise jammers by searching a frequency band removed from the band in which the carrier frequency falls. Consequently, the signals will not be generated to command the victim radar to enter the so-called "home-on-jam"(HOJ) mode, nor will the victim radar declare a coherent target track.

Even if the jammer analysis circuitry in a semiactive missile were effective to command the victim radar to enter the HOJ mode, a narrow band jammer of the type here contemplated would nevertheless continue to prevent proper guidance. Thus, when the HOJ mode is entered in a semiactive guidance system, a speed gate (Doppler tracking loop) is swept across a predetermined acquisition bandwidth (in the order of 60 kHz), in an attempt to acquire a tracking signal on jammer energy. If, however, bandwidth of the narrow band jammer is low compared to the predetermined acquisition bandwidth, then the apparent duty cycle would not allow tracking on the jamming signal.

SUMMARY OF THE INVENTION

With the foregoing background of the invention in mind it is a primary object of this invention to provide narrow band jammer detection and tracking circuitry for a semiactive radar guidance system.

The foregoing and other objects of this invention are generally attained by providing logic circuitry in a victim radar that is adapted to produce a "lock" signal for a speed gate in such radar when signals indicative of a narrow band jammer occur on two successive sweeps of the speed gate. Thus, during each of two successive sweeps, the logic circuitry is arranged: first, to produce (and to store) a signal indicative of the extant frequency of the speed gate when, as the result of the reception by the victim radar of a narrow band jamming signal, the speed gate enters a "pause" mode, the automatic gain control signal increases and there is no coherency between the received signal and a voltage-controlled oscillator (VCO) in the speed gate; and, then, if the signals indicative of the extant frequency of the speed gate are the same on the two successive sweeps, generates a "lock" signal whereby frequency and angle tracking of the narrow band jamming signal is commenced.

BRIEF DESCRIPTION OF THE DRAWINGS

For a more complete understanding of this invention, reference is now made to the following description of a preferred embodiment of the invention as illustrated in the accompanying drawings in which.

DESCRIPTION OF THE PREFERRED EMBODIMENT

Because the contemplated jammer detection and tracking circuitry is intended for use in any known CW semiactive seeker and the theory of operation of CW semiactive seekers is well known to those of skill in the art (see, for example, pp 16–19 and 16–20 of "Radar Handbook," M. I. Skolnik, Editor-in-Chief, McGraw-Hill Book Co., 1970), only those portions of such a seeker required for an understanding of the contemplated narrow band jammer detection and tracking circuitry will be described in detail.

Figure 1:
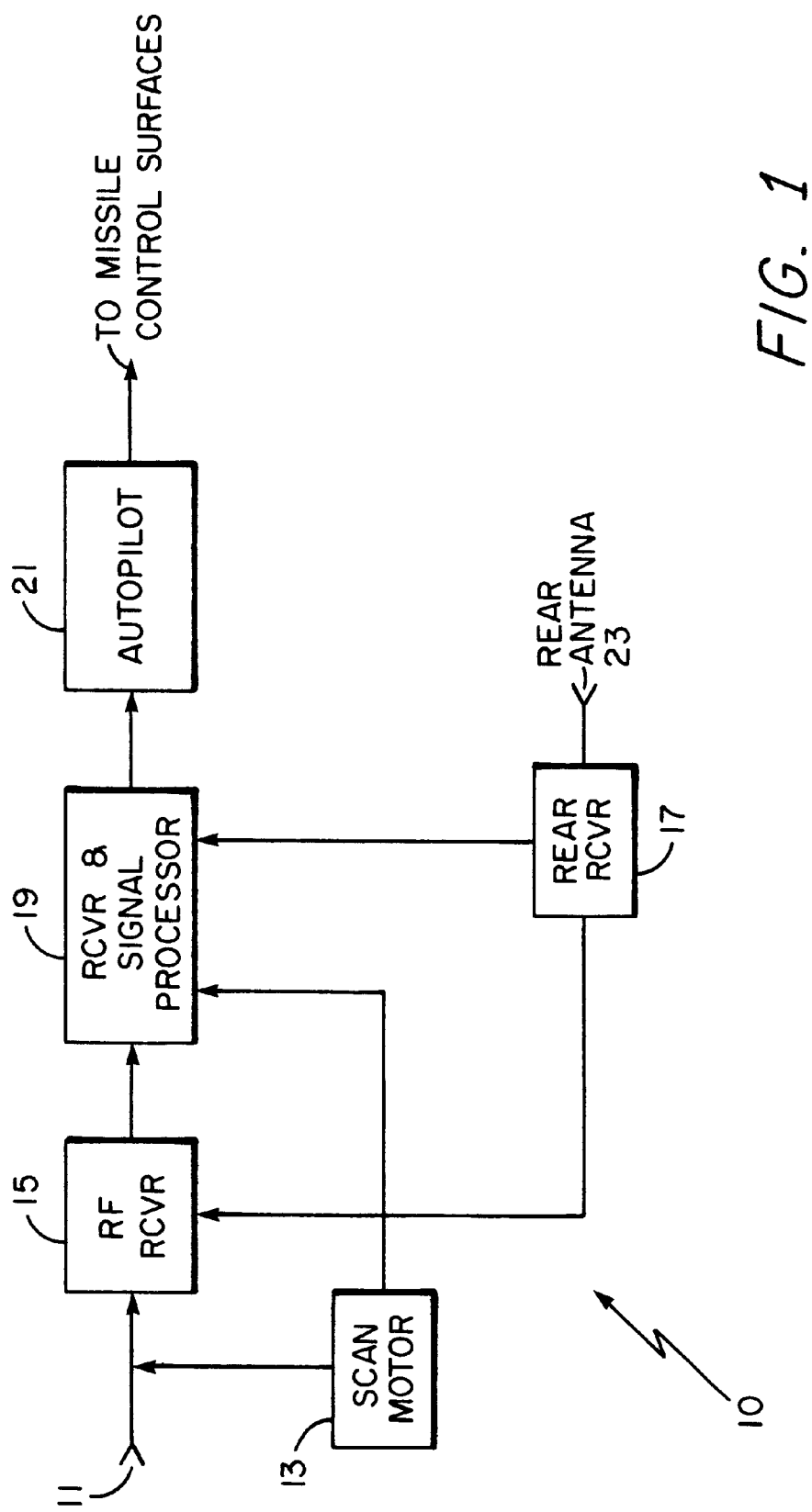
FIG. 1 is a simplified block diagram of a CW semiactive missile seeker incorporating the invention.

Referring now to FIG. 1, a conventional CW semiactive missile seeker 10 is shown to include a front antenna assembly 11, which is here a conical scan antenna driven by a scan motor 13. Target return or jamming signals received by the antenna assembly 11 are passed to a radio frequency (R.F.) receiver 15 wherein downconversion to suitable intermediate (I.F._1) frequency signals is accomplished by heterodyning with a coherent reference signal provided by a rear receiver 17. The output signals from the R.F. receiver 15 are passed to a receiver and signal processor 19. Within the latter the signals are up-converted to a suitable intermediate frequency (I.F._2) and processed in a speed gate (Doppler tracking loop) in a manner to be described in detail hereinbelow with reference to FIG. 2. The output signals from the receiver and signal processor 19 are applied to a conventional autopilot 21 wherein control signals for the missile control surfaces (not shown) are developed.

Completing the seeker 10 is a rear antenna 23 that is effective to intercept a portion of the signal transmitted from a victim radar (not shown) and to pass such portion to the rear receiver 17 wherein a coherent reference signal is developed for the R.F. receiver 15. It should be noted here in passing that the rear receiver 17 is also effective to strip off a ranging reference signal (here an audio frequency FM modulation signal) encoded onto the radar illuminating signal and to provide that reference signal to the receiver and signal processor 19 for reasons which will be made clear hereinbelow.

Before proceeding with a detailed description of the contemplated narrow band jammer detection and tracking circuitry, it will be instructive at this point to briefly review the effect of a narrow band jammer on a CW semiactive missile system. Thus, as mentioned briefly hereinbefore, the narrow band jammer is effective to produce a narrow band of noise centered about the carrier frequency of the victim radar that will not be detected by any known jammer analysis circuit in such radar. Consequently, a HOJ enable signal is not ordinarily generated for the missile seeker 10. Further, even if a HOJ enable signal were to be generated, the relatively low apparent duty cycle caused by the narrow spectral width of the narrow band jammer would generally preclude guiding on the jamming signal.

Figure 2:
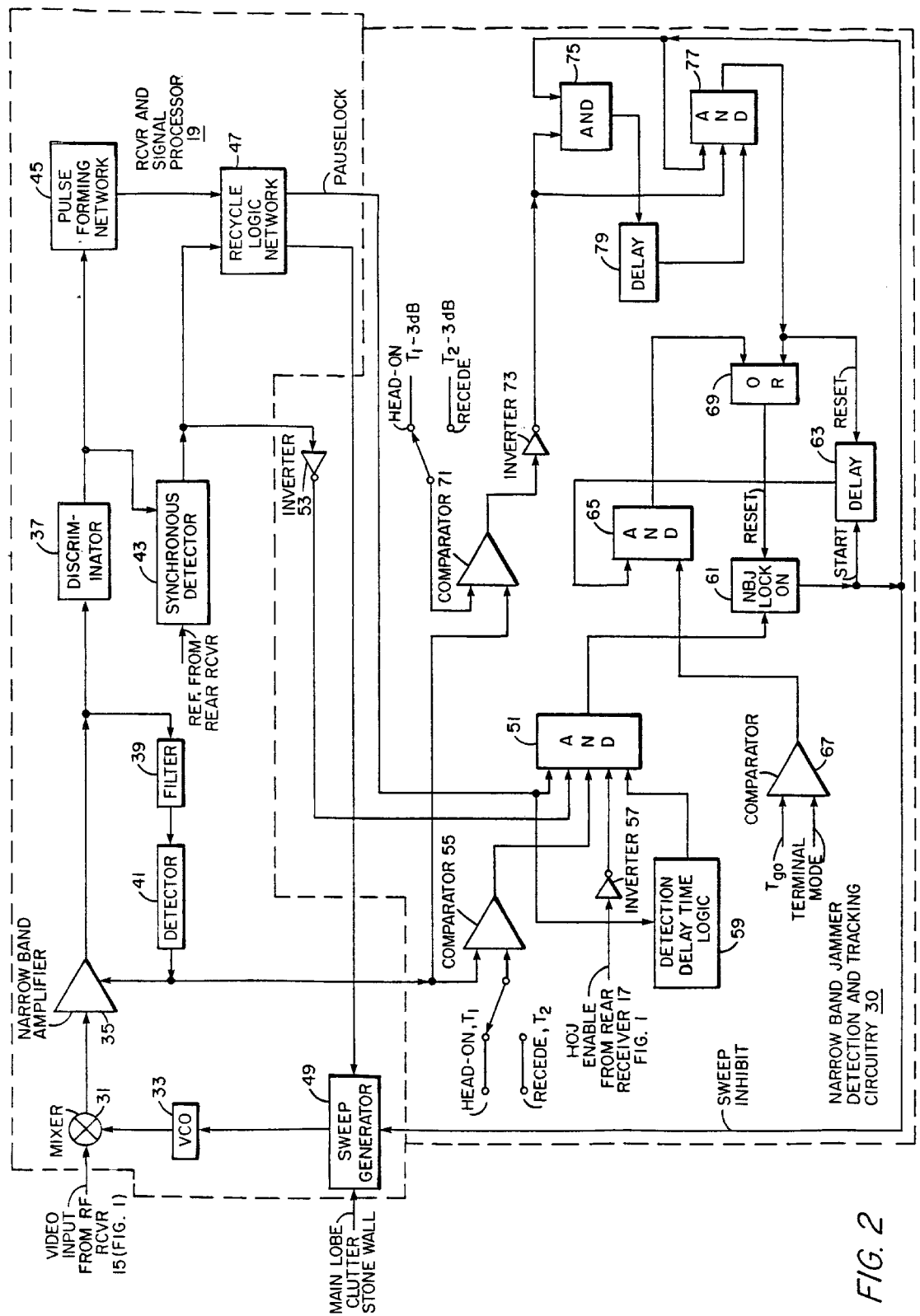
FIG. 2 is a simplified block diagram illustrating how narrow band jammer detection and tracking circuitry according to this invention may be integrated into the CW semiactive missile seeker of FIG. 1.

Referring now to FIG. 2, narrow band jammer detection and tracking circuitry 30 according to this invention is shown to be implemented within the receiver and signal processor 19 and to operate on logic inputs normally developed within such processor. Thus, the input signal from the R.F. receiver 15 (FIG. 1) is applied to a mixer 31 wherein it is converted to a suitable intermediate frequency (I.F.) by being heterodyned with the output signal from a voltage-controlled oscillator (VCO) 33. The I.F. output signal from the mixer 31 is amplified in a narrow band amplifier 35. The output signal from the latter is split, with a first portion thereof being applied to a conventional discriminator 37 and a second portion being applied, via a filter 39 and a detector 41, back to the amplifier 35 as an automatic gain control (AGC) signal. The output signal from the discriminator 37 is applied both to a synchronous detector and a pulse forming network 45. The reference signal input to the synchronous detector 43 is the audio frequency ranging reference signal from the rear receiver 17 (FIG. 1). It will now be appreciated by those of skill in the art that the synchronous detector 43 is provided to test for the presence of a coherent target return signal. That is to say, the audio frequency ranging signal encoded onto a target return signal will be detected against the ranging reference signal within the synchronous detector 43 to produce a logic level "1" output signal from the latter. Conversely, when the input signal to the discriminator 37 is from a narrow band jammer, the audio frequency ranging reference signal will not appear at the output of the discriminator 37 and a logic level "0" will be produced by the synchronous detector 43. The output signals from both the synchronous detector 43 and the pulse forming network 45 are applied to a recycle logic network 47. The latter is effective when the outputs of the pulse forming network 45 and the synchronous detector 43 are both at logic level "1", to generate a SWEEP INHIBIT signal for a sweep generator 49 that controls the VCO 33. The sweep generator 49 also, for convenience, is here adapted to store the value of the sweep when an "INHIBIT" signal is received.

It will now be appreciated by those of skill in the art that the just-recited elements constitute a speed gate or Doppler tracking loop. Thus, when the output signal from the synchronous detector 43 is a logic level "1" and a pulse output is simultaneously received from the pulse forming network 45, the recycle logic network 47 will generate a SWEEP INHIBIT signal for the sweep generator 49 and target tracking at the then existing output frequency of the VCO 33 will commence. Conversely, if when a pulse output from the pulse forming network 45 is obtained a logic level "0" (indicating the presence of a non-coherent or jamming input) is obtained from the synchronous detector 43, a PAUSE LOCK signal will be generated by the recycle logic network 47 and the sweep generator 49 will be halted for a 150 millisecond pauselock period.

The narrow band jammer detection and tracking circuitry 30 operates on the fact that when the speed gate (not numbered) sweeps through a narrow band jammer a PAUSE LOCK will be generated by the recycle logic network 47. In addition, when a narrow band jammer is present, the AGC level may be expected to rise and the output signal from the synchronous detector 43 will be at a logic level "0". Consequently, the PAUSE LOCK output from the recycle logic network 47 is provided as one input to an AND gate matrix 51. A second input to the AND gate matrix 51 is the output from the synchronous detector 43 passed through an inverter 53. The third input to the AND gate matrix 51 is obtained from a comparator 55, one input to which is the AGC control signal from the detector 41. The second input to the comparator 55 is obtained from a switch (not numbered) that is effective to select one of two thresholds, $T_1$ or $T_2$, depending upon whether a "head-on" or "recede" engagement is taking place. The output signal from the comparator 55 will be a logic level "1" whenever the AGC level is greater than the applicable one of the thresholds, $T_1$ or $T_2$. The fourth input to the AND gate matrix 51 is obtained from an inverter 57, the input signal to which is the HOJ ENABLE signal. It should be recalled here that the HOJ ENABLE signal is not generated by the victim radar (not shown) by a narrow band noise jamming signal, but is generated by other types of noise jamming. Therefore, a narrow band noise jamming signal is the noise jamming signal that would produce a logic level "1" at the output of the inverter 57. The final input to the AND gate matrix 51 is provided by a detection delay time logic network 59 that is activated by the PAUSE LOCK output from the recycle logic network 47. The detection delay time logic network 59 is provided to insure that all the logic inputs to the AND gate 51 are present for a sixty millisecond period in order to discriminate against PAUSE LOCKS on noise and ensure that the signal in the speed gate (not numbered) is, in fact, from a narrow band jammer.

When all inputs to the AND gate matrix 51 are at a logic "1" level, a logic "1" input signal is produced to control a narrow band jammer (NBJ) lock on circuit 61, here a bistable multivibrator. The NBJ lock on circuit 61 then is effective to develop a SWEEP INHIBIT signal for the sweep generator 49. Upon receipt of the SWEEP INHIBIT signal from the NBJ lock of circuit 61 the sweep generator 49 samples and stores the value of the control voltage for the VCO 33. The SWEEP INHIBIT signal from the NBJ lock on circuit 61 is also provided as a trigger signal to a two second delay network 63 that is provided to initiate a resweep or reset command for the NBJ lock on circuit 61 once every two seconds until the terminal phase of flight begins. To this end the delay network 63 provides a logic level "1" input to an AND gate 65 at the end of each two second interval. The second input to the latter is obtained from a comparator 67 that provides a logic level "1" output whenever the time-to-go to intercept, $T_{go}$, is greater than the time period set for the terminal phase of flight. The output signal from the AND gate 65 is passed, via an OR gate 69, as a RESET command to the NBJ lock on circuit 61. Upon receipt of the RESET command, the latter terminates the SWEEP INHIBIT command and the sweep generator 49 begins to resweep in an attempt to lock on either the target skin return or a compressor/turbine line.

During the next sweep, if a logic level "1" is obtained from the AND gate 51, the NBJ lock on circuit 61 again generates a SWEEP INHIBIT command for the sweep generator 49. The latter then again samples the value of the control voltage for the VCO 33 and compares that sample with the sample obtained during the initial SWEEP INHIBIT period. If the comparison indicates that both events occurred at the same frequency, the speed gate (not numbered) will be allowed to track on that frequency and the radar gates (not shown) will be closed, allowing radar guidance.

Within the narrow band jammer detection and tracking circuitry 30 provision has also been made to allow the dropping of the narrow band jammer designation (achieved following two consecutive SWEEP INHIBIT signals from the NBJ lock on circuitry 61) and reinitiation of sweep in the event that the AGC level drops 3 dB or more below the detection threshold for at least 100 milliseconds. To this end, the AGC level from the output of the AGC detector 41 is applied to one input port of a comparator 71. The second input signal to the latter is obtained via a switch (not numbered) and represents either threshold ($T_1-3$ dB) or threshold ($T_2-3$ dB). If the AGC level falls below either of these thresholds, the comparator 71 will provide a logic level "0" output signal. That output signal is passed, via an inverter 73, to a pair of AND gates 75, 77. The second input signal to AND gate 75, which is also provided as an input to the AND gate 77, is the SWEEP INHIBIT output signal from the NBJ lock on circuit 61. Thus, when the speed gate (not numbered) is tracking a NBJ and the AGC level falls greater than 3 dB below the corresponding threshold level, the AND gate 75 will provide a logic level "1" output that will be delayed 100 milliseconds by a delay network 79 prior to being provided as the third input signal to the AND gate 77. If the AGC level remains greater than 3 dB below the corresponding threshold level for a period greater than 100 milliseconds, the AND gate 77 will provide a logic level "1" output signal that is provided as a RESET signal to the two second delay network 63 and is applied, via the OR gate 69, as a RESET command to the NBJ lock on circuit 61. As mentioned briefly hereinabove, upon receipt of the RESET command the latter terminates the SWEEP INHIBIT output and the sweep generator 49 begins normal sweep operation in an attempt to reacquire a target.

Finally, it should be noted that the design of the narrow band jammer detection and tracking circuitry 30 is predicated on the assumption that the position of main lobe clutter is known and that a known so-called sweep "stonewall" (i.e., a stop corresponding to the main lobe clutter frequency below which the sweep generator 49 will not sweep) can be set up against the main lobe clutter. Otherwise, the entry of main lobe clutter returns into the pass band of the speed gate (not numbered) could cause a lock onto and track on the main lobe clutter returns.

Having described a preferred embodiment of this invention, it will now be clear to one of skill in the art that changes may be made without departing from our inventive concepts. For example, the manner in which detection is effected of the various characteristics of a narrow band noise jammer may be changed. In addition, it should be noted that the described invention may be used to counter jamming signals from a frequency modulated jammer. It is felt, therefore, that this invention should not be restricted to the disclosed embodiment, but rather should be limited only by the spirit and scope of the appended claims.

What is claimed is:

1. In a semiactive radar guidance system wherein a narrow band noise jamming signal from a repeater may prevent proper operation of a victim radar in such system, such radar incorporating a frequency modulated transmitter and incorporating a receiver with an automatic frequency controller operable firstly to cause the frequency of a local oscillator to be changed in a programmed manner to search for received signals, and secondly, upon attaining a predetermined frequency offset from the frequency of any received signal, to pause to test the then received signal and, if found to be from a target, to track such signal, the receiver also including an automatic gain controller, a synchronous detector and an improved jammer detecting and tracking arrangement comprising:

(a) first comparator means, responsive to a signal representative of the frequency modulation on the transmitted signal and to any received signal, for producing a first control signal;

(b) second comparator means, responsive to the amplitude of the automatic gain control signal and either one of two reference signals, for producing a second control signal;

(c) means, responsive to a signal indicative of a pause in the programmed manner in which the frequency of the local oscillator is changed, to produce a third control signal; and (d) means, responsive to the simultaneous existence, at successively spaced intervals of time, of the first, second and third control signals, for producing a fourth control signal to cause the automatic frequency controller to track the then extant received signal.

2. The improved jammer detecting and tracking arrangement as in claim 1 wherein the first comparator means comprises:

(a) a synchronous demodulator, responsive to any received signal and to the modulation signal applied to the signal transmitted by the victim radar, for producing a first signal representative of any frequency modulation on such signal; and (b) inverter means, responsive to the first signal, for producing the first control signal.

3. The improved jammer detecting and tracking arrangement as in claim 2 wherein the second comparator means comprises:

(a) switching means to select either one of two reference signals having different levels; and (b) a voltage comparator, responsive to the amplitude of the selected one of the reference signals out of the switching means and to the amplitude of the automatic gain control signal, for producing the second control signal.

* * * * *